(12) United States Patent
Okui

(10) Patent No.: US 7,612,468 B2
(45) Date of Patent: Nov. 3, 2009

(54) UNINTERRUPTIBLE POWER SUPPLY DEVICE WITH CIRCUIT FOR DEGRADATION JUDGMENT OF STORAGE BATTERY

(75) Inventor: Yoshiaki Okui, Toshima-ku (JP)

(73) Assignee: Sanyo Denki Co., Ltd., Tokyo (JP)

( * ) Notice: Subject to any disclaimer, the term of this patent is extended or adjusted under 35 U.S.C. 154(b) by 367 days.

(21) Appl. No.: 10/784,193

(22) Filed: Feb. 24, 2004

(65) Prior Publication Data

US 2004/0196005 A1    Oct. 7, 2004

(30) Foreign Application Priority Data

Apr. 4, 2003    (JP) .............................. 2003-101558

(51) Int. Cl.
    *H02J 9/00*    (2006.01)
(52) U.S. Cl. ............................ 307/66; 307/64; 320/138
(58) Field of Classification Search ................... 307/66, 307/64, 37; 320/138; 363/26, 37
    See application file for complete search history.

(56) References Cited

U.S. PATENT DOCUMENTS

| | | | | |
|---|---|---|---|---|
| 4,775,827 A | * | 10/1988 | Ijntema et al. | 320/132 |
| 5,196,780 A | * | 3/1993 | Pacholok | 320/148 |
| 5,747,887 A | * | 5/1998 | Takanaga et al. | 307/64 |
| 5,939,798 A | * | 8/1999 | Miller | 307/64 |
| 6,021,052 A | * | 2/2000 | Unger et al. | 363/26 |
| 6,295,215 B1 | * | 9/2001 | Faria et al. | 363/37 |
| 6,445,089 B1 | * | 9/2002 | Okui | 307/66 |
| 6,509,657 B1 | * | 1/2003 | Wong et al. | 307/66 |
| 6,556,459 B2 | * | 4/2003 | Okui et al. | 363/37 |
| 7,061,139 B2 | * | 6/2006 | Young et al. | 307/45 |
| 2005/0094339 A1 | * | 5/2005 | Okui et al. | 361/90 |

FOREIGN PATENT DOCUMENTS

| | | | |
|---|---|---|---|
| GB | 2287843 | * | 9/1995 |
| JP | 05260684 | * | 10/1993 |
| JP | 08051735 | * | 2/1996 |
| JP | 10014251 | * | 1/1998 |
| JP | A 2000-50525 | | 2/2000 |
| JP | 2000139040 | * | 5/2000 |
| JP | 2000341865 | * | 12/2000 |

OTHER PUBLICATIONS

Smart Battery Data Specification @ http://www.sbs-forum.org/specs/errata_sbdat110a.pdf, Revision 1.1, Benchmarq Electronics, Dec. 1998, pp. 1-49.*

* cited by examiner

*Primary Examiner*—Edward Tso
*Assistant Examiner*—Samuel Bernhanu
(74) *Attorney, Agent, or Firm*—Oliff & Berridge, PLC

(57) ABSTRACT

There is herein provided an uninterruptible power supply device with a degradation judgment circuit 4 of a storage battery 2 which can perform an exact judgment, continuing the power supply to a load apparatus 8 stably without giving the excessive burden to the storage battery 2. The storage battery 2 is floatingly charged from a rectifier 1 connected with the power source 10. The device has the control circuit 3 for controlling the output voltage of the rectifier 1 and the degradation judgment circuit 4. The output voltage of the rectifier 1 is lowered to below a steady state by the control circuit 3. As a result, the storage battery 2 discharges with the current Idc restricted rather than rated discharge current. And a part of power supply is supplied to the load 8. The degradation judgment circuit 4 judges the degradation of the storage battery based on the discharge voltage Vdc.

9 Claims, 4 Drawing Sheets

4 :Degradation Judgmen Circuit by Discharge Voltage

4 :Degradation Judgmen Circuit by Discharge Voltage

5 :Degradation Judgmen Circuit by Charge Time

UNINTERRUPTIBLE POWER SUPPLY DEVICE WITH CIRCUIT FOR DEGRADATION JUDGMENT OF STORAGE BATTERY

BACKGROUND OF THE INVENTION

This invention relates to an uninterruptible power supply device of computers or communication apparatuses, connecting to a circuit for degradation judgment for a storage battery built therein.

Supplying a current from an alternating power to various communication apparatuses and so on, the uninterruptible power supply device is inserted between the alternating power and such a communication apparatus in order to prevent the power from stopping by its unexpected failure or an interception of a breaker and damaging the apparatus or interrupting work.

There are two types of a normal converter power supply system and a normal supply system from a commercial power roughly dividing such uninterruptible power supply devices. The former is equipped with a rectification circuit, a storage battery and a converter. It normally carries out floating charge to the storage battery with a direct current obtained from the rectification circuit and supplying an alternating current converting from the direct current by the converter to the load apparatus. In the latter, the alternating current is directly supplied from an alternating power to the load apparatus. On the other hand, the storage batter is carried out such floating charge with a direct current of an alternating-direct current conversion from the power.

If any type of the uninterruptible power supply devices stop to be supplied power at power failure etc., the storage battery will discharge and a direct-alternating current conversion of the discharge current will be carried out. And as long as the discharge of the storage battery continues, power is supplied and the load apparatus continues to drive without an intermission. If the power failure and so on stops in the meantime, it will return to the usual power supply state.

The storage battery degrades by over discharge of itself or drives of itself for a long range time. If the storage battery of the uninterruptible power supply device has degraded, discharge will not continue for a long time and the power source will not return in time, or if the degradation is remarkable, the discharge voltage is insufficient to drive the load apparatus.

Therefore, an uninterruptible power supply device attaches a circuit for judging the degradation of the storage battery. It is most generally known such a circuit judges by comparing a curve of the instant discharge current of the storage battery and a discharge curve of a normal storage battery i.e. reference curve thereof. It is also known that an impedance of such a storage battery is measured to judge the degradation. Japanese Patent Provisional Publication No. 2000-50525 discloses a method for judging the degradation by observing discharge progress of the storage battery when reducing a supplying voltage to the load from the power converter to make the storage battery discharge.

However, these prior judgment methods take a long time to make the storage battery discharge until the curve of the discharge current is obtained enough. A reference curve according to a kind of a storage battery or/and a discharging rate thereof is required and that a memory for the reference curve is required. A setup thus becomes complicated. Moreover, judging promotes the degradation of the storage battery since an unusual burden is applied thereto. Actually, when the storage battery has degraded, the discharge may stop during the judgment, and an original function may be unable to be achieved as an uninterruptible power source.

SUMMARY OF THE INVENTION

The present invention has been developed to solve the foregoing problems. It is an object of the present invention to provide an uninterruptible power supply device for supplying power to a load and charging floatingly to a storage battery with the degradation judgment circuit of the storage battery which can perform an exact judgment, achieving an original function as an uninterruptible power source of continuing the power to stably supply to the load apparatus without giving the excessive burden to the storage battery.

The present invention was developed for accomplishing the foregoing object. The uninterruptible power supply device of the present invention is used for supplying power to a load and charging floatingly to a storage battery from a converter connecting to a alternating current power source. The device comprises a control circuit for controlling an output voltage of the converter to lower below a steady state, the storage battery thus to discharge at a more limited current than the rated current thereof, and the converter to supply a part of load current to the load; and a judgment circuit for judging the degradation of the storage battery based on the discharge voltage of the limited discharge current.

In another aspect of the uninterruptible power supply device of the present invention comprises; a control circuit for controlling an output voltage of the converter to lower below a steady state, the storage battery thus to discharge at a more limited current than the rated current thereof, and the converter to supply a part of load current to the load; and a judgment circuit judges the degradation of the storage battery based on a charging time of the storage battery from when controlling, by the control circuit, the converter to return the output voltage to the steady state until completing full charge state thereof.

In the uninterruptible power supply device of the present invention, the converter is a rectifier and the load may include a direct-alternating current inverter in addition to a whole load apparatus.

In the present uninterruptible power supply device, the converter is a rectifier and a direct-alternating current inverter may be connected on midway between the storage battery and the load.

In the present uninterruptible power supply device, the converter comprises a mutual transducer of direct and alternating current, which connects to the power source in parallel with the load, and which connects the storage battery thereto.

In the present uninterruptible power supply device, the converter comprises a transducer of alternating and direct current which connects to the power source in parallel with the load, and which connects the storage battery and a direct-alternating current inverter.

In the present uninterruptible power supply device, the limited discharge current of the storage battery, by controlling the output voltage of the converter to lower below the steady state, is almost constant what is equivalent to 10-50% of the maximum current of the load. In an embodiment, the limited discharge current of the storage battery is controlled at a constant current of around 30% of the maximum current of the load.

In the present uninterruptible power supply device, the control circuit connects to a trigger signal source which comprises memory memorized an operational schedule of the degradation judgment, and the converter starts to lower the output voltage at the timing of the trigger signal and the storage battery then starts to discharge.

In the present uninterruptible power supply device, the converter and the control circuit comprise a rectifier for obtaining a direct current from the alternating current power source, and a closing loop for bringing the voltage of the direct current close to an appointed direct current voltage with a pulse duration modulation control for an alternating input voltage of itself.

In the present uninterruptible power supply device, the degradation judgment circuit comprises a comparator for comparing between an appointed value of a direct current voltage from the control circuit and the discharge voltage of the storage battery.

In the present uninterruptible power supply device, the degradation judgment circuit comprises an integration circuit for integrating with a voltage difference between the appointed value of the direct current voltage form the control circuit and a discharge voltage of the storage battery, and a comparator for comparing between the output voltage of the integration circuit and a standard voltage.

In the other aspect of the uninterruptible power supply device of the present invention, the degradation judgment circuit comprises a timer for measuring the charge time of the storage battery.

In the other aspect of the present uninterruptible power supply device, the degradation judgment circuit comprises a timer connecting to a comparator for comparing a charging current of the storage battery with a base current.

DETAILED DESCRIPTION OF THE INVENTION

Preferable examples of the present invention will be below explained in detail seeing drawings.

Figure 1:
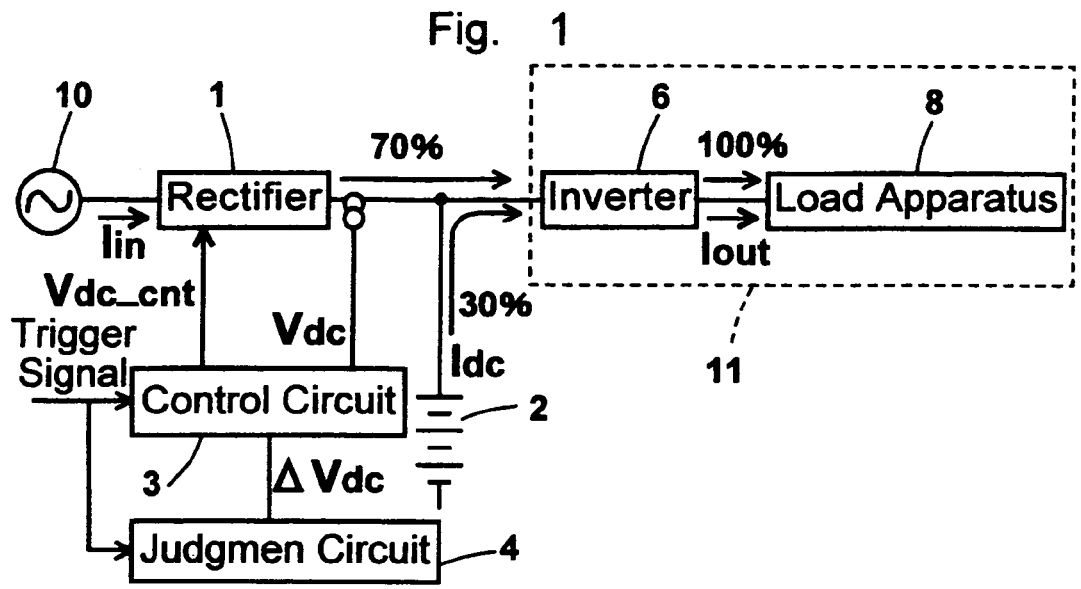
FIG. 1 is a block circuit diagram showing an example of composition of the uninterruptible power supply device with the degradation judgment circuit of the storage battery which applies the present invention.

FIG. 1 shows a block circuit diagram of an example of the uninterruptible power supply device with the degradation judgment circuit of the storage battery, which applies the present invention, is so called as a normal inverter power supply system.

In the uninterruptible power supply device of FIG. 1, a rectifier 1 is connected to a power source of commercial alternating current 10, and a storage battery 2 and a load apparatus 8 through an inverter 6 are connected to the output side thereof. A control circuit 3 is connected to the rectifier 1, refer FIGS. 1 and also 2, of which direct current output is controlled in an optional constant voltage. A degradation judgment circuit 4 for battery based on discharge voltage of the storage battery is connected to the control circuit 3 with a trigger signal for starting operation thereof.

Figure 2:
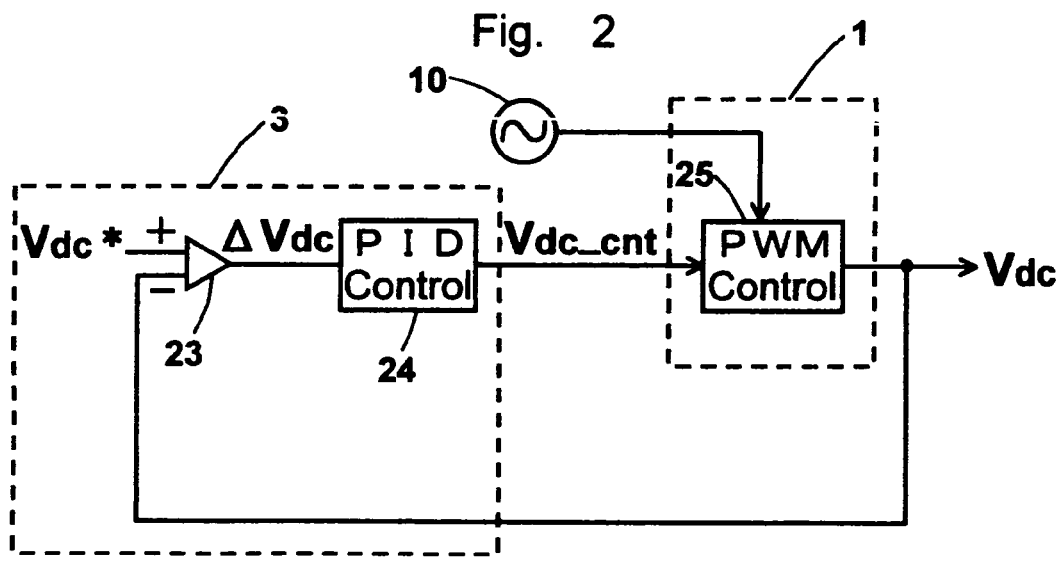
FIG. 2 is a block circuit diagram showing an example of the control circuit of the uninterruptible power supply device with the degradation judgment circuit of the storage battery which applies the present invention.

The rectifier 1, in FIG. 2, to which the control circuit is connected for obtaining output of a direct current voltage Vdc from the power source of the commercial alternating current 10 aiming at an appointed value Vdc* of a direct current voltage. From the appointed value Vdc* of the direct current voltage, a voltage comparator 23, PID control device 24, that is a Proportional-Integral-Derivative control, and a pulse width modulation (PWM) 25 are connected in this order, and then the direct current voltage Vdc is output. The direct current voltage Vdc feeds back to the voltage comparator 23 and thus constitutes a closing loop.

The uninterruptible power supply device of FIG. 1 converts alternating current from the commercial power source to a constant voltage direct current wit the rectifier 1 and the control circuit 3 under the steady state. The input alternating current is controlled with the pulse width modulation and repeatedly controlled with the closing loop to approach the appointed value Vdc* of the direct current voltage which is set up in the control circuit 3, and which is then output under the steady state. The direct current output carries out the floating charge of the storage battery 2, changes to a sine wave voltage, that is an alternating current, with the inverter 6, and then the changed alternating current is supplied to the load apparatus 8.

When power stops from the power source of commercial alternating current 10 at a power failure and so on, the storage battery 2 discharges and its discharge current is changed into alternating current with inverter 6. The load apparatus 8 continue to be supplied of power and operate without an intermission as long as continuing of discharge from the storage battery 2. If the power failure and so on stops in the meantime, it will return to the usual power supply of the steady state.

In order to judge the degradation of the storage battery 2, the appointed value Vdc* of the direct current voltage of the control circuit 3 is lowered and then the output voltage of the rectifier 1 is lowered to below the steady state at the time of inputting of the trigger signal to the control circuit 3. In this example, the degradation is judged by setting up the appointed value Vdc* of the direct current voltage so that the storage battery 2 discharges the current equivalent to 30% of the maximum current of the load apparatus 8.

In the storage battery 2 of this example, 168 storage cells of rated voltage 2V per one connects in series to each other so that the rated voltage thereof is 336 V. The appointed value Vdc* of the direct current voltage set in the control circuit 3 under the steady state is 382 V of floating charge voltage, namely 2.275 V per a cell. The output voltage of the rectifier 1 is controlled to 382V by the closing loop function of the control circuit 3 under the steady state. When the trigger signal inputs in the control circuit 3, the appointed value Vdc* of the direct current voltage is set to 340V, namely 2.024 V per a cell, and the degradation is judged by operating the closing loop function of the control circuit 3. Consequently, 30% of discharge current Idc of the storage battery 2 and 70% of current from the rectifier 1 inputs into the inverter 6 if the load apparatus 8 is operating with the greatest current. The control circuit 3 keeps the appointed value Vdc* of the direct current voltage constant. If an actuating current of the load apparatus 8 decreases from the maximum, the discharge current Idc of the storage battery 2 will be kept constant and the current from the rectifier 1 will decrease. Therefore, if the actuating current of the load apparatus 8 is 50% of the maximum, 30% of the discharge current Idc of the storage battery 2 and 20% of the current from the rectifier 1 are input. That is to say, if the discharge current of the storage battery is set to 30%, the examination can start when the rate of load is over 30%.

Figure 3:
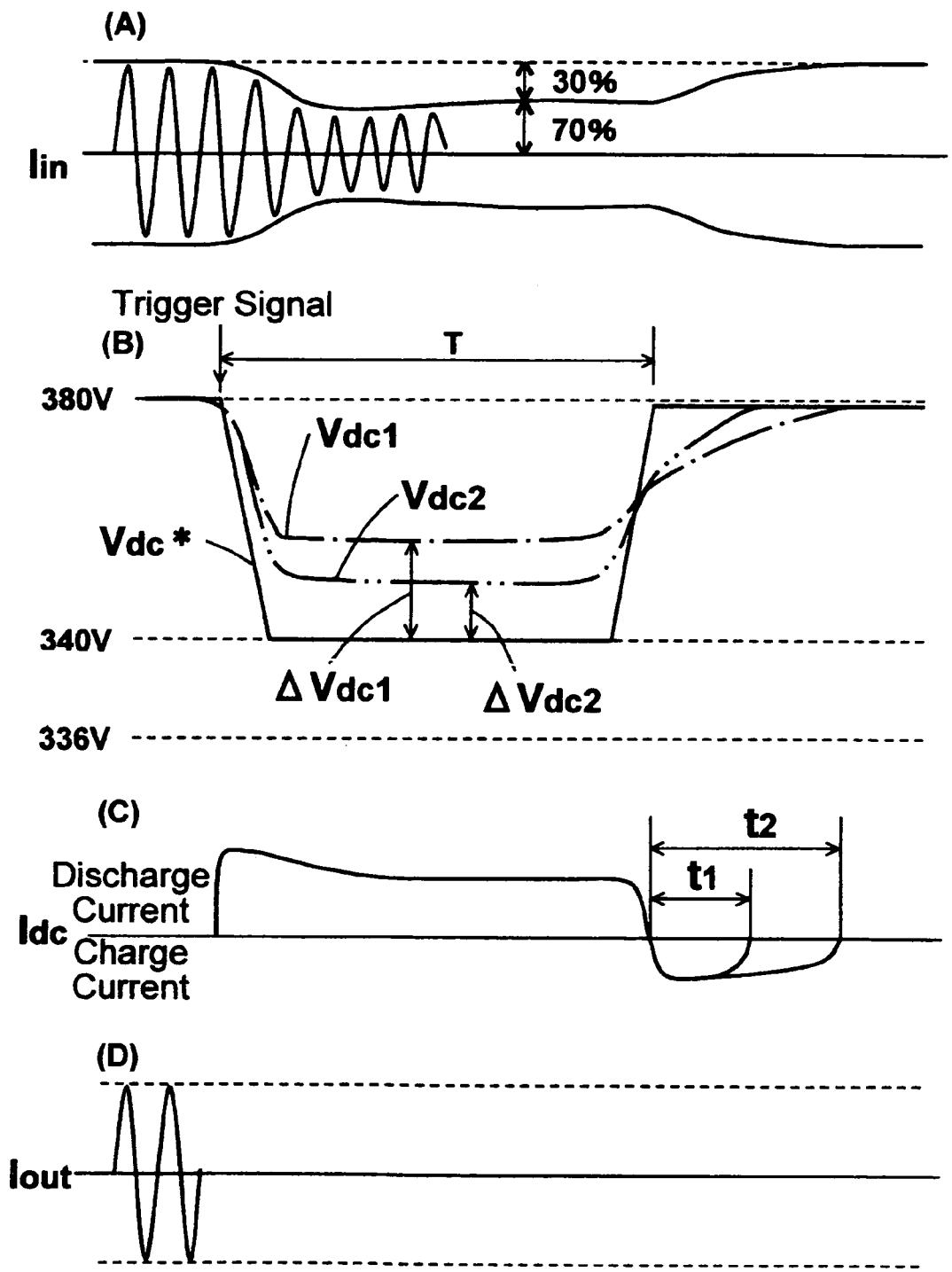
FIG. 3 is a waveform diagram explaining a circuit operation of the uninterruptible power supply device with the degradation judgment circuit of the storage battery which applies the present invention.

FIG. 3 shows the waveform of the actuating current when judging the degradation of the present uninterruptible power supply device with the degradation judgment circuit of the storage battery and when before and after the judgment. The input current Iin from the power source of commercial alternating current 10 controlled to the sign wave start to the degradation judgment with a trigger signal, see (A), the amplitude decreases maintaining the sine wave since, see (C), the discharge current of the storage battery is added. As the current Idc from the storage battery 2 is added to the output current of the rectifier 1, it is constant that the whole current flows into the inverter 6. Therefore, see (D), the output alternating current Iout from inverter 6, that is the current supplied to the load apparatus 8, is constant. Even if the degradation judgment is carried out, the load apparatus 8 can continue operation similar to the steady state.

FIG. 3(B) shows the rated voltage, an appointed value Vdc* of the direct current voltage, and discharge voltages of the storage battery 2. As shown in (B), a potential difference $\Delta Vdc1$ between a discharge voltage Vdc1 and the appointed voltage Vdc* is large if the storage battery 2 is normal. A potential difference $\Delta Vdc2$ between a discharge voltage Vdc2 and the appointed voltage Vdc* is small if the storage battery 2 has degraded. In the degradation judgment circuit 4 for the storage battery by the discharge, normal or degradation of the storage battery 2 is distinguished strengths of the discharge voltages $\Delta Vdc$ in the state to be judged, refer FIGS. 6 and 7.

For example, when a appointed value Vdc* of the direct current voltage is lowered to 340V in degradation judgment state, a discharge voltage of new storage battery 2 is 346V but a discharge voltage of a storage battery degraded in about 50% is 342V. The degradation can be judged by such distinction of the strength of the discharge voltage.

After time T have passed, returning the set of the appointed voltage Vdc* of the control circuit 3 to 382V of the steady state from 340V of the degradation judgment state, the output voltage Vdc of the rectifier 1 builds up gradually to 382V with the closing loop function of the control circuit 3, restricting the charge current to the storage battery. Therefore, as shown in FIG. 3(C), the storage battery 2 discharged as current Idc until that moment turns to be charged from the rectifier 1. That means that the current Idc of the storage battery 2 changes the charge current indicated the negative side from the discharge current indicated the positive side. The storage battery 2 is then saturated with the charge by passing time t.

Figure 4:
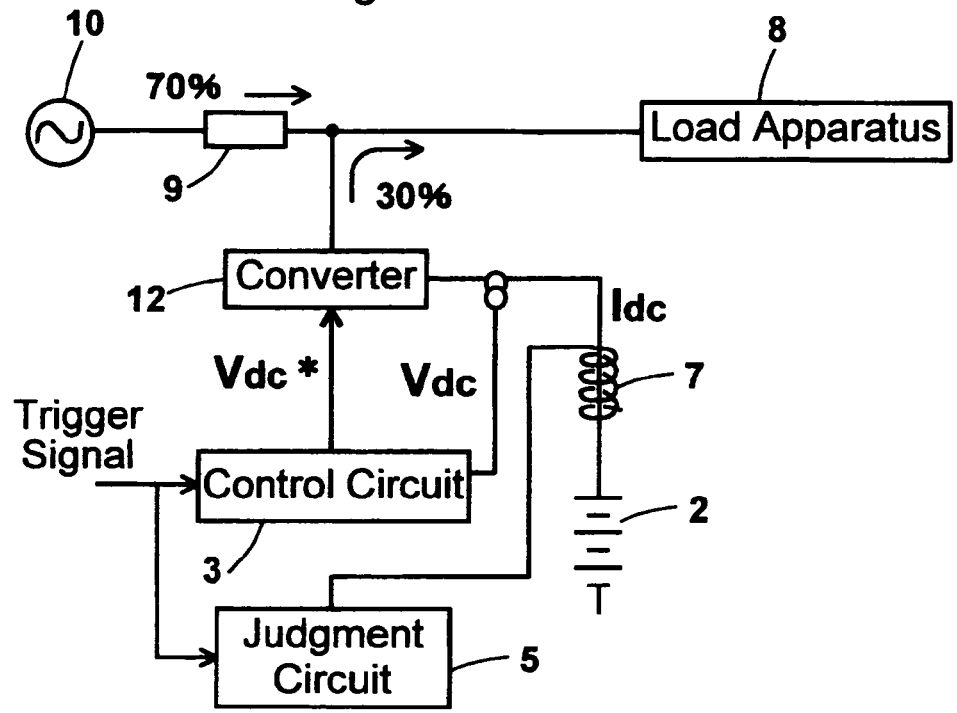
FIG. 4 is a block circuit diagram showing another example of the composition of the uninterruptible power supply device with the degradation judgment circuit of the storage battery which applies the present invention.

FIG. 4 is the block circuit diagram showing another example of a composition of the present uninterruptible power supply device with the degradation judgment circuit of the storage battery. The uninterruptible power supply device is a normal supply system from a commercial power.

As shown in FIG. 4, a load apparatus 8 is connected to the power source of commercial alternating current 10 through a switching circuit 9. A converter 12 as for converting mutually alternating-direct current or direct-alternating current is also connected thereto in parallel with the load apparatus 8. The control circuit 3 is connected to the converter 12, and the storage battery 2 is also connected to the converter 12. An ammeter 7 is connected to the output side of the storage battery 2 and also to the degradation judgment circuit 5 for the storage battery 2 by the charge time thereof. A trigger signal of the degradation judgment 5 can input to the control circuit 3 and the degradation judgment circuit 5. The control circuit 3 is the same composition as what is shown in FIG. 2.

In the uninterruptible power supply device, the switching circuit 9 turns on under the steady state and, thus, power is directly supplied to the load apparatus 8 from the power source of commercial alternating current 10. On the other hand, the converter 12 converts alternating-direct current to floating the storage battery 2. If the power from the power source of commercial alternating current 10 stops by the power failure and so on, the switching circuit 9 operates to switch off. Then the storage battery 2 discharges and the converter 12 converts direct-alternating current from its discharge current. The load apparatus 8 continue to be supplied of power and operate without an intermission as long as continuing of discharge from the storage battery 2. If the power failure and so on stops in the meantime, the switching circuit 9 switches on and it return to the usual power supply from the power source of commercial alternating current.

The degradation judgment operation and the time chart of the control circuit 3 of the uninterruptible power supply device shown in FIG. 4 is the same as that of FIG. 1 so that such explanation is omitted for avoiding duplicate description. However, the circuit operation differs a little at a point of the degradation judgment circuit 5 bases on the charge time of the storage battery.

As shown in FIG. 3(C), after ending the discharge with the restricted current restricted for the degradation judgment of the storage battery, that means the time T passes, if the storage battery 2 is normal, the charge continues for a long time as seen t2, but if the storage battery 2 is degraded, the charge completes for a short time as seen t1. Therefore, the normality or the degradation of the storage battery is distinguished by measuring the time t with a timer in the degradation judgment circuit 5.

For example, when an appointed value Vdc* of a direct current voltage is lowered to 340V and a discharge time T takes 15 seconds, a charge time t of a new storage battery 2 is 12 seconds, but a charge time t of a storage battery 2 degraded about 50% of its capacity is 4 seconds. The degradation is thus judged by measuring the charge time t.

Figure 5:
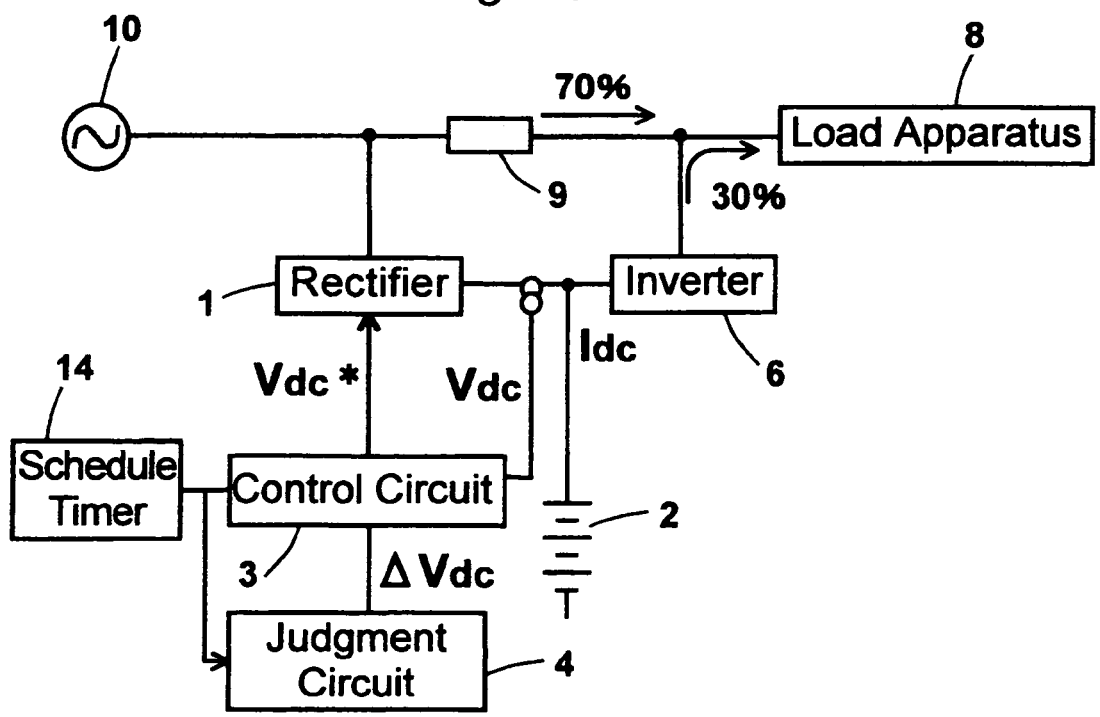
FIG. 5 is also a block circuit diagram showing another example of the composition of the uninterruptible power supply device with the degradation judgment circuit of the storage battery which applies the present invention.

FIG. 5 is also a block circuit diagram showing another example of the composition of the uninterruptible power supply device with the degradation judgment circuit of the storage battery which applies the present invention. This type of the uninterruptible power supply device is a normal supply system from a commercial power and, however, is different in aspect of the device from the above one.

As shown in FIG. 5, the load apparatus 8 through the switching circuit 9 is connected to the power source of commercial alternating current 10. The rectifier 1 as the transducer and the inverter 6 are also connected thereto. The output side of the inverter 6 is connected to the load apparatus 8. The control circuit 3 is connected to the rectifier 1. The degradation judgment circuit 4 of the storage battery based on the discharge voltage of the storage battery is connected to the control circuit 3. The storage battery 2 is connected between the rectifier 1 and the inverter 6. Moreover, the schedule timer 14 which generates the trigger signal for the degradation judgment of the storage battery is also connected to the control circuit 3. The control circuit 3 is the same composition as what is shown in FIG. 2.

In the present uninterruptible power supply device, the switching circuit 9 is turned on under the steady state, so the power is directly supplied to the load apparatus 8 from the power source of commercial alternating current 10. On the other hand, the floating charge is carried out to the storage battery 2 by the direct current from the rectifier 1. The switching circuit 9 operates if the power from the power source of commercial alternating current 10 stops by the power failure and so on. Then the storage battery 2 discharge and direct-alternating current conversion of its discharge current are carried out at the inverter 6. The converted alternating current is supplied to the load apparatus 8. If the power failure and so on stops in the meantime, the switching circuit 9 switches on to return to the usual power supply from the power source of commercial alternating current.

The explanation of operation containing the circuit of the control circuit 3 and the time chart in the degradation judgment operation of the uninterruptible power supply device with the degradation judgment circuit of the storage battery shown in FIG. 5 is the same as that of FIG. 1. But the degradation judgment of the storage battery is periodically started based on the trigger signal which is generated by the schedule timer 14 according to the maintenance cycle of the apparatus.

Figure 6:
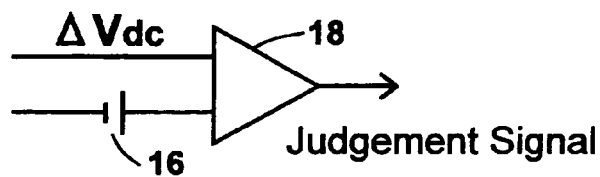
FIG. 6 is a block circuit diagram showing an example of degradation judgment circuit of the storage battery of the uninterruptible power supply device with the degradation judgment circuit of the storage battery which applies the present invention.

FIG. 6 is the circuit diagram showing a concrete example of composition of the degradation judgment circuit 4 of the storage battery shown in FIG. 1 and FIG. 5. This type of a degradation judgment circuit 4 of the storage battery is based on discharge voltage of the storage battery 2, and has a direct current power source 16 and a voltage comparator 18. As shown in FIG. 3(B), a voltage $\Delta Vdc$, that is a potential difference between the discharge voltage Vdc of the storage battery 2 and the appointed value Vdc* of the direct current voltage at the time of the degradation judgment of the storage battery, is large if the storage battery 2 is normal, but is small if the storage battery 2 has degraded. The voltage $\Delta Vdc$ and a voltage of the power source 16 is compared by the voltage comparator 18. Then a normal signal is obtained from the voltage comparator 18 if the former one is larger, or else a degradation signal is obtained.

Figure 7:
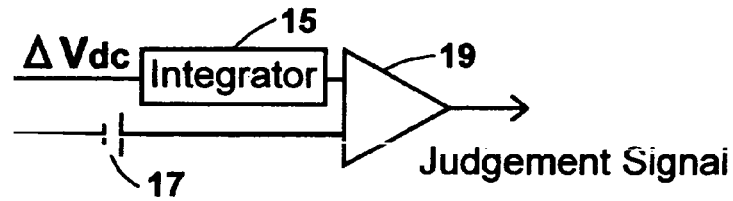
FIG. 7 is similarly a block circuit diagram showing another example of degradation judgment circuit of the storage battery.

FIG. 7 is also the circuit diagram showing another example of composition of the degradation judgment circuit 4 of the storage battery based on the discharge voltage of the storage battery shown in FIG. 1 and FIG. 5. This type of a degradation judgment circuit 4 of the storage battery, the degradation is also judged based on the potential difference $\Delta Vdc$. The value of the voltage $\Delta Vdc$ of the potential difference is so small that it is difficult to handle. Therefore, the voltage $\Delta Vdc$ of the potential difference is integrated with time T at the integrator 15 and then the integrated value of the voltage $\Delta Vdc$ and the voltage of the power source of base voltage 17 is compared by the voltage comparator 19.

The degradation judgement circuit based on the discharge voltage of the storage battery 2 shown in FIG. 6 and FIG. 7 can be applied to the uninterruptible power supply device shown in FIG. 4 as well as the one shown in FIG. 1 and FIG. 5.

Figure 8:
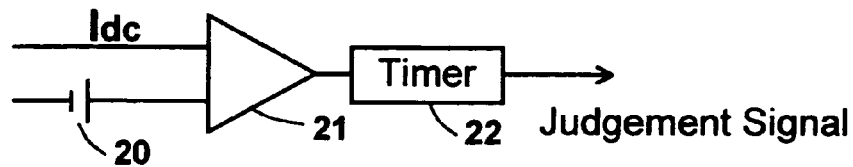
FIG. 8 is similarly a block circuit diagram showing another example of degradation judgment circuit of storage battery.

The degradation judgment circuit 5 of the storage battery shown in FIG. 4 is on the charge time and is fundamentally composed of the timer. A concrete example of the degradation judgment circuit 5 of this type can also be used as shown in FIG. 8. The circuit 5 has a power source 20 of a base current, a current value comparator 21 and a timer 22. The charge current Idc of the storage battery 2 and a current from the power source 20 is compared by the current value comparator 21 and time is measured by the timer 22 while the charge current Idc is larger than the current of the power source 20. The normal signal is given if the measured time is long, or else a degradation signal is given.

The degradation judgment circuit based on charge time can be applied to the uninterruptible power supply device shown in FIG. 1 and FIG. 5 as well as that shown in FIG. 4.

Furthermore, both degradation judgment circuits 4 of the storage battery based on the discharge voltage and on charge time can also be applied to the uninterruptible power supply device which supplies the direct current. In the uninterruptible power supply device, the inverter 6 and the load apparatus 8 are collectively considered as the load 11 in the circuit shown in FIG. 1.

The schedule timer 14, which generates the trigger signal for the degradation judgment of the storage battery shown in FIG. 5, is applied to the uninterruptible power supply device shown in FIG. 1 and FIG. 4.

As a whole, illustrated or described circuits or elements can be carried out in all combination within a range of the essence of the present invention.

As it is mentioned above in detail, the judgment of the storage battery by the present uninterruptible power supply device with the degradation judgment circuit of the storage battery can judge exactly in short time without the unnecessary burden to the storage battery since the storage battery is not made to discharge with a long time or large current. The uninterruptible power supply device does not lead to so-called destructive inspection. The present uninterruptible power supply device can judge exactly and supplies stably source to load so that is very preferable to automatically and intentionally maintain a storage battery without stopping the load apparatus.

What is claimed is:

1. An uninterruptible power supply device for supplying power to a load and for floatingly charging a storage battery from a converter connecting to an alternating current power source, and having a degradation judgment circuit for the storage battery, the degradation judgment circuit comprising:
   a control circuit for controlling an output voltage of the converter to be lower than a steady state voltage, so as to cause the storage battery to discharge at a more limited current than the rated current of the storage battery, and so as to cause the converter to supply a part of a load current to the load;
   a judgment circuit that judges the degradation of the storage battery based on a charging time of the storage battery from a time when the control circuit controls the output voltage of the converter to return to the steady state voltage to a time when the battery is fully charged, the judgment circuit using the charging time to determine whether the storage battery is degraded or normal, a degraded storage battery having a maximum storage capacity that is less than a maximum storage capacity of a new storage battery of the same kind thereof, and
   a timer for measuring the charging time of the storage battery from the time when the control circuit controls the output voltage of the converter to return to the steady state voltage to the time when the battery is fully charged.

2. The uninterruptible power supply device according to claim 1, wherein said judgment circuit comprises a timer connecting to a comparator for comparing a charging current of the storage battery with a base current.

3. The uninterruptible power supply device according to claim 1, wherein said converter is a rectifier and said load includes a direct-alternating current inverter and a load apparatus.

4. The uninterruptible power supply device according to claim 1, wherein said converter is a rectifier, the uninterruptible power supply device further comprising a direct-alternating current inverter connected midway between the storage battery and the load.

5. The uninterruptible power supply device according to claim 1, wherein said converter comprises a mutual transducer of direct and alternating current, which connects to the power source in parallel with the load, and which connects the storage battery thereto.

6. The uninterruptible power supply device according to claim 1, wherein said converter comprises a transducer of alternating and direct current which connects to the power source in parallel with the load, and which connects the storage battery and a direct-alternating current inverter.

7. The uninterruptible power supply device according to claim 1, wherein said limited discharge current of the storage battery, caused by controlling the output voltage of the converter to lower below the steady state, is almost constant at what is equivalent to 10-50% of the maximum current of the load.

8. The uninterruptible power supply device according to claim 1, wherein said control circuit connects to a trigger signal source which comprises a memory in which an operational schedule for the degradation judgment is stored, and the converter starts to lower the output voltage at the timing of the trigger signal and the storage battery then starts to discharge.

9. The uninterruptible power supply device according to claim 1, wherein said converter and said control circuit comprise a rectifier for obtaining a direct current from the alternating current power source, and a closing loop for bringing the voltage of the direct current close to an appointed direct current voltage with a pulse duration modulation control for an alternating input voltage of itself.

* * * * *